United States Patent Office 3,356,448
Patented Dec. 5, 1967

3,356,448
METHOD OF PREPARING DICALCIUM PHOSPHATE SUBSTANTIALLY FREE FROM F, Fe, AND Al IMPURITIES
Gordon J. Turner, Baltimore, Md., assignor to W. R. Grace & Co., New York, N.Y., a corporation of Connecticut
No Drawing. Filed Aug. 18, 1964, Ser. No. 390,467
4 Claims. (Cl. 23—109)

This invention provides a method of recovering a relatively pure phosphate ion from wet process phosphoric acid.

In summary, this invention comprises adding a saturated solution of commercial urea or solid urea to a settled merchant grade wet process phosphoric acid in a substantially equimolar ratio of urea:$H_3PO_4$, thereby precipitating urea phosphate, recovering said urea phosphate, and then dissolving it in water along with a calcium compound selected from the group consisting of calcium carbonate, calcium hydroxide, calcium chloride, and calcium oxide, the pH of the solution being in the range of 5.0 to 7.0; then heating said solution at a temperature of 60–95° C. for 5 to 30 minutes, and collecting the fine crystalline precipitate of dicalcium phosphate dihydrate formed thereby, said dicalcium phosphate dihydrate being substantially free from fluoride, iron, and aluminum ions.

It is certainly well known in the art that wet process phosphoric acid contains many impurities which render it unfit to use as an animal feed supplement. Accordingly, there have been patented methods for purifying wet process acid. For example, U.S. 2,504,544, 2,384,813, 2,384,814, and others, provide means for removing fluorine, an impurity encountered in all wet process acids. Other common impurities are aluminum, iron, sodium, and potassium phosphates, silica compounds and complexes. Calcium compounds are also present, and organic materials may be introduced in small amounts from concentration and other procedures.

Wet process acid is normally allowed to stand quiescent for 4 to 20 days until a large amount of sludge deposits, said deposits being compounds of the above impurities. However, while the decanted acid is shipped as wet process acid (substantially all in the orthophosphoric acid form) calcium products made from this are acids unfit to use as animal feed supplements, since they contain many impurities, and do not meet the requirements of The Association of American Feed Control Officials for feed grade phosphates, particularly in respect to fluorine.

However, I have found, surprisingly, that urea phosphate, when precipitated from a wet process orthophosphoric acid solution, contains substantially none of the impurities associated with wet process acid. Furthermore, I have found that the thus produced urea phosphate, when dissolved in water, and treated with a calcium salt, forms a dicalcium phosphate dihydrate precipitate eminently suitable for use as an animal feed supplement.

This invention is further described by the following example.

Example 592 gms. of 74% ($H_3PO_4$) wet process phosphoric acid analyzing 53.8% $P_2O_5$, 1.25% $Al_2O_3$, 2.24% $Fe_2O_3$, and 0.89% F (all percentages weight percent) was treated at 80° C. with 200 gms. of commercial urea containing 46% N, thus providing a mole ratio of urea:$H_3PO_4$ of substantially 1:1. The crystallized urea phosphate product weighed 293 gms., and analyzed 17.7% N, 44.7% $P_2O_5$, 0.12% $Al_2O_3$, 0.25% $Fe_2O_3$, and 0.01% F. 100 grams of the urea phosphate was dissolved in 175 gms. of water and the stoichiometric equivalent of calcium carbonate, i.e., to provide a $Ca^{++}/PO_4^{\equiv}$ ratio of 1:1 (64.0 gms.) was added, with agitation. Solution was then heated to 90° C., to drive off excess $CO_2$ and provide a digestion period, whereby a fine crystalline precipitate separated from solution. Solution pH was 5.0. This precipitate was identified by X-ray diffraction analysis as dicalcium phosphate dihydrate, $CaHPO_4 \cdot 2H_2O$. Upon heating to 175° C., dicalcium phosphate anhydride was formed which was confirmed by X-ray diffraction analysis. Analysis of the $CaHPO_4$ product was total $P_2O_5 = 49.9\%$, $CaO = 40.7\%$, $F = 0.05\%$, $Fe_2O_3 = 0.10\%$, $Al_2O_3 = 0.18\%$. The $$CaO/P_2O_5$$

mole ratio was 2.07, and the product contained 0.22 parts of fluorine per 100 parts phosphorus. Product recovery was 92% was based on the amount of urea phosphate.

Preferred embodiments of my invention are as follows:

The mole ratio of urea:$H_2PO_4$ is preferably 1:1, and operably 1:0.8–1.2.

The temperature at which urea phosphate is crystallized is operably from 10 to 35° C., preferably 20–30° C., or substantially room temperature.

The concentration of urea phosphate in water should be preferably 1 gm./1–1.5 $H_2O$, and operably from 1 gm./gm. $H_2O$ to any reasonable concentration. Commercially, it is preferred as a maximum concentration, i.e., about 1:1. A stoichiometric amount of calcium salt will produce the desired pH range of 5.0–7.0, preferably on the acid side of neutrality.

The temperature to which the urea phosphate/calcium salt solution is heated is 60–95° C. so as to drive off excess $CO_2$, for 1–5 minutes. If the carbonate salt of calcium is not used, heating is still recommended as it helps decrease crystal size and prevent occlusion. Heating is done in an open vessel, at atmospheric (ambient) pressures.

The precipitated calcium phosphate dihydrate can be easily recovered by filtration, centrifugation, or decantation, or any other suitable method known in the art.

The filtrate from the calcium phosphate dihydrate, containing urea in solution, can be evaporated to solid crystalline urea and re-used to precipitate urea phosphate. Alternately, the urea solution can be concentrated to a saturated urea solution at room temperature added to the acid in that form. If the urea solution is saturated, little or no effect is noticed on the yield obtained.

The wet process acid residue after removal of urea phosphate, which contains a high percentage of dissolved impurities can be used in crystallization of urea phosphate again, until fluorine content is so high as to contaminate the urea phosphate or after 1–5 more crystallizations. It can then be used as a fertilizer ingredient, thus recovering whatever nitrogen and phosphorus values remain in the liquor.

The dicalcium phosphate dihydrate can be dried to the anhydride form if desired. Temperature of drying can be operably 150–200° C., and preferably 170–180° C. The anhydride form may be preferable to the dihydrate due to transportation costs.

Having fully described my invention, what is claimed is:

1. The method of preparing dicalcium phosphate substantially free from F, Fe, and Al impurities starting from wet process orthophosphoric acid containing said impurities comprising adding urea to said impure wet process phosphoric acid in a substantially equimolar ratio of urea:$H_3PO_4$, thereby precipitating urea phosphate, recovering it, and then dissolving said recovered urea phosphate in water and adding to said urea phosphate solution a calcium compound selected from the group consisting of calcium carbonate, calcium hydroxide, calcium chloride, and calcium oxide, the pH of said solution being in the range of 5.0–7.0; then heating said solution at a temperature of 60–95° C. for 1 to 5 minutes, and recovering the fine crystalline precipitate of dicalcium phosphate dihydrate thus formed.

2. The method of claim 1 in which the urea is added to the wet process phosphoric acid at a temperature of 10–35° C.

3. The method of claim 1 in which the urea phosphate is dissolved in substantially equivalent parts by weight of water.

4. The method of claim 3 in which the calcium compound is added in stoichiometric quantity to the urea phosphate.

References Cited

UNITED STATES PATENTS 3,065,053 11/1962 Aia _____ 23—109
3,110,560 11/1963 Ranby et al. _____ 23—109

OSCAR R. VERTZ, *Primary Examiner.*

H. S. MILLER, *Assistant Examiner.*